United States Patent
Yokoyama

Patent Number: 6,058,212
Date of Patent: *May 2, 2000

[54] MOTION COMPENSATED INTERFRAME PREDICTION METHOD BASED ON ADAPTIVE MOTION VECTOR INTERPOLATION

[75] Inventor: Yutaka Yokoyama, Tokyo, Japan

[73] Assignee: NEC Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/782,659

[22] Filed: Jan. 14, 1997

[30] Foreign Application Priority Data

Jan. 17, 1996 [JP] Japan .................................. 8-005492

[51] Int. Cl.[7] .............................. G06K 9/36; G06K 9/46
[52] U.S. Cl. ......................... 382/236; 348/407; 348/699; 382/239
[58] Field of Search .................................. 382/236, 241, 382/243, 239, 242, 250, 248; 348/407, 413, 416, 431, 699; 358/428, 430, 432, 433; 345/474

[56] References Cited

U.S. PATENT DOCUMENTS

| | | | |
|---|---|---|---|
| 5,592,228 | 1/1997 | Dachiku et al. | 382/241 |
| 5,598,216 | 1/1997 | Lee | 382/241 |
| 5,623,313 | 4/1997 | Naveen | 348/416 |
| 5,654,771 | 8/1997 | Tekalp et al. | 382/241 |
| 5,689,306 | 11/1997 | Jung | 348/416 |
| 5,748,231 | 5/1998 | Park et al. | 348/699 |

OTHER PUBLICATIONS

T.G. Campbell, "Very Low Bitrate Video Coder Using Warping Prediction", Eighth Image Coding Symposium (PCSJ93) of 1993, 8–7, pp. 167–168.

G.J. Sullivan, et al., "Motion Compensation for Video Compression Using Control Grid Interpolation", The 1991 International Conference on Acoustics, Speech and Signal Processing: ICASSP91, M9.1, pp. 2713–2716.

Y. Nakaya, et al., "A Basic Study on Motion Compensation With Triangles", Technical Study Report of Image Engineering Research Group of Electronic Information Communication Engineering Society, IE90–106, pp. 9–16.

*Primary Examiner*—Amelia Au
*Assistant Examiner*—Timothy M. Johnson
*Attorney, Agent, or Firm*—Ostrolenk, Faber, Gerb & Soffen, LLP

[57] ABSTRACT

In a method of interpolating the motion vectors at all pixel positions in a frame on the basis of the motion vectors at plural predetermined representative points to perform motion compensated prediction of moving pictures, there is adaptively selected one of a method for dividing the frame into plural areas and interpolating the motion vector every area is selected from a conventional method of linearly interpolating a motion vector by using all the surrounding representative points, a method of separately detecting motion vectors for an area, a method of further dividing an area into plural subareas, a method of temporarily converting the values of the motion vectors at the representative points into values to be used for the motion vector interpolation, and a method of setting a fixed value as a prediction value.

19 Claims, 12 Drawing Sheets

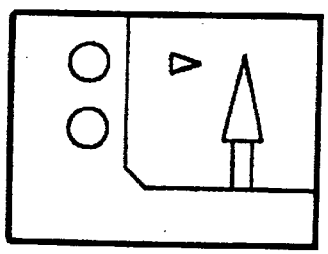
REFERENCE IMAGE
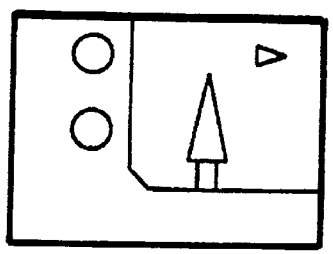
CURRENT IMAGE
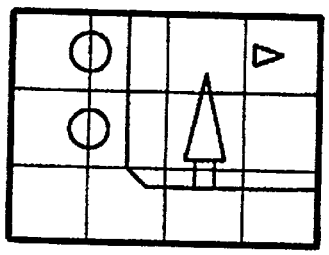
GRID SET ON
CURRENT IMAGE
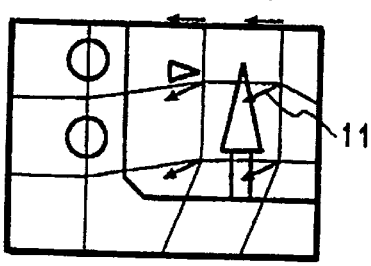
CORRESPONDING GRID ON
REFERENCE IMAGE
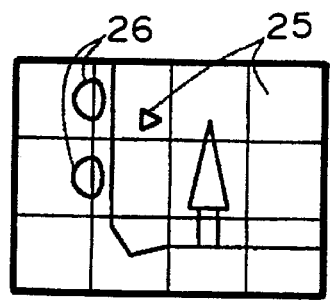
PREDICTED IMAGE BASED ON
ONLY VECTOR INTERPOLATION
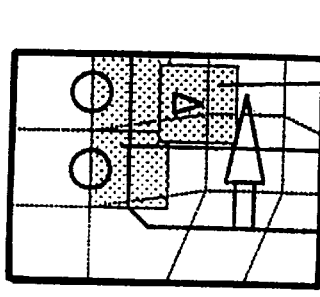
REFERENCE POSITION UNDER
ADAPTIVE PREDICTION
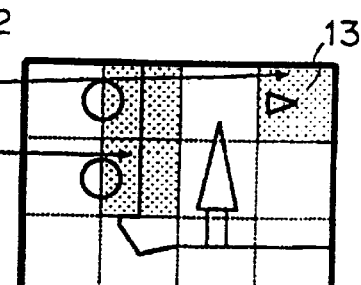
ADAPTIVELY
PREDICTED IMAGE

REFERENCE POSITION UNDER ADAPTIVE PREDICTION

ADAPTIVELY PREDICTED IMAGE

REFERENCE POSITION UNDER ADAPTIVE PREDICTION

ADAPTIVELY PREDICTED IMAGE

ADAPTIVELY PREDICTED IMAGE

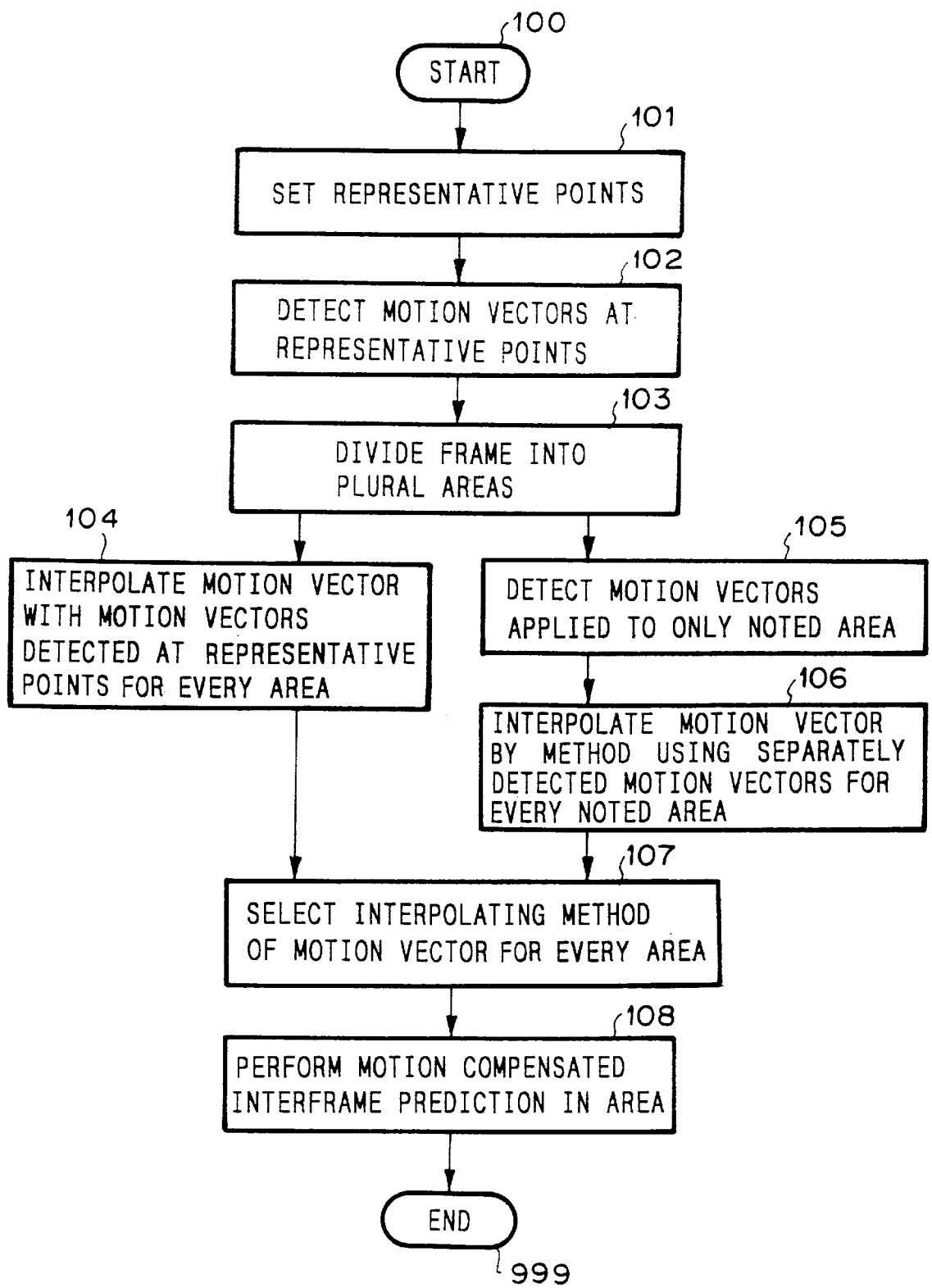

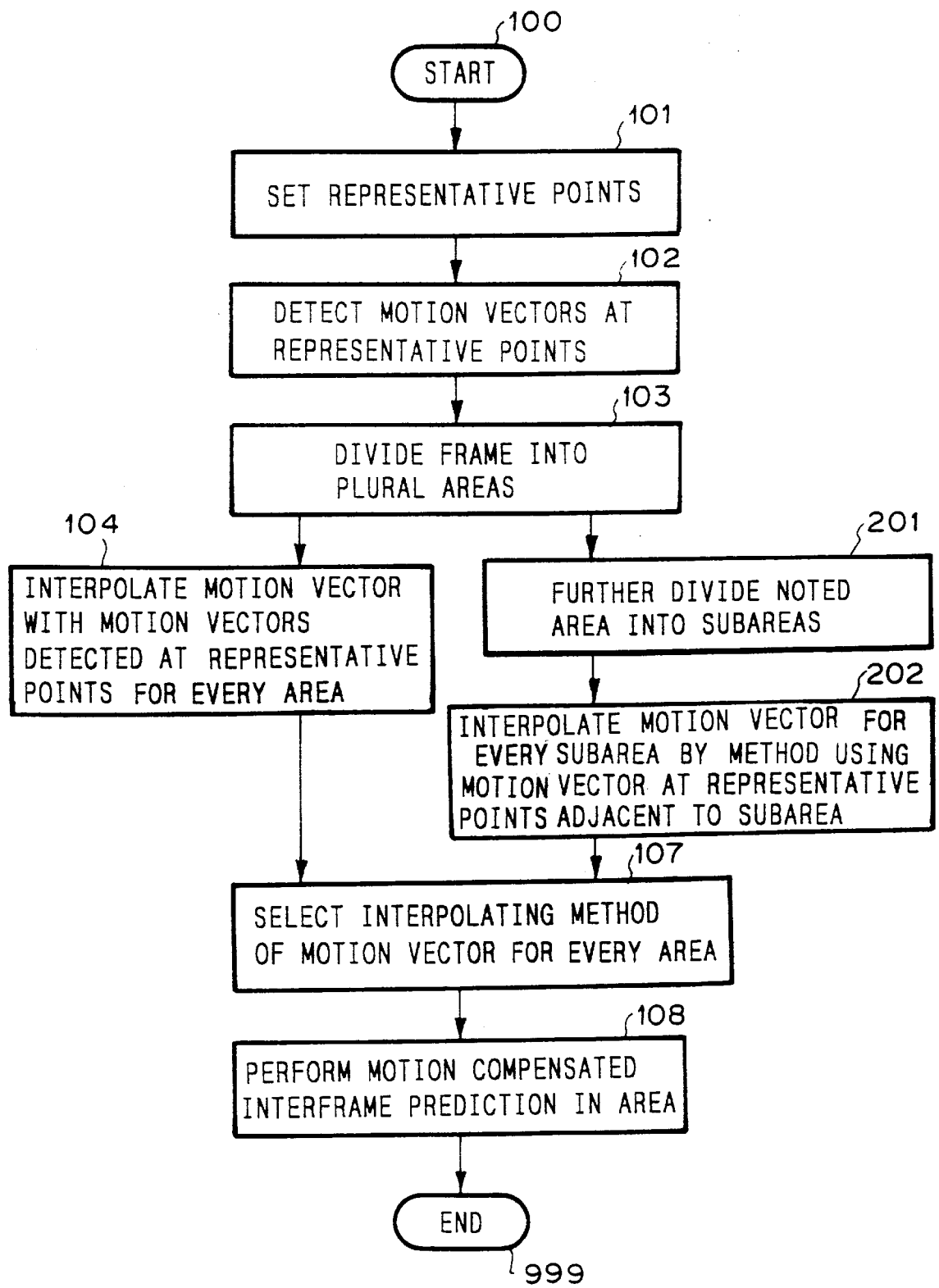

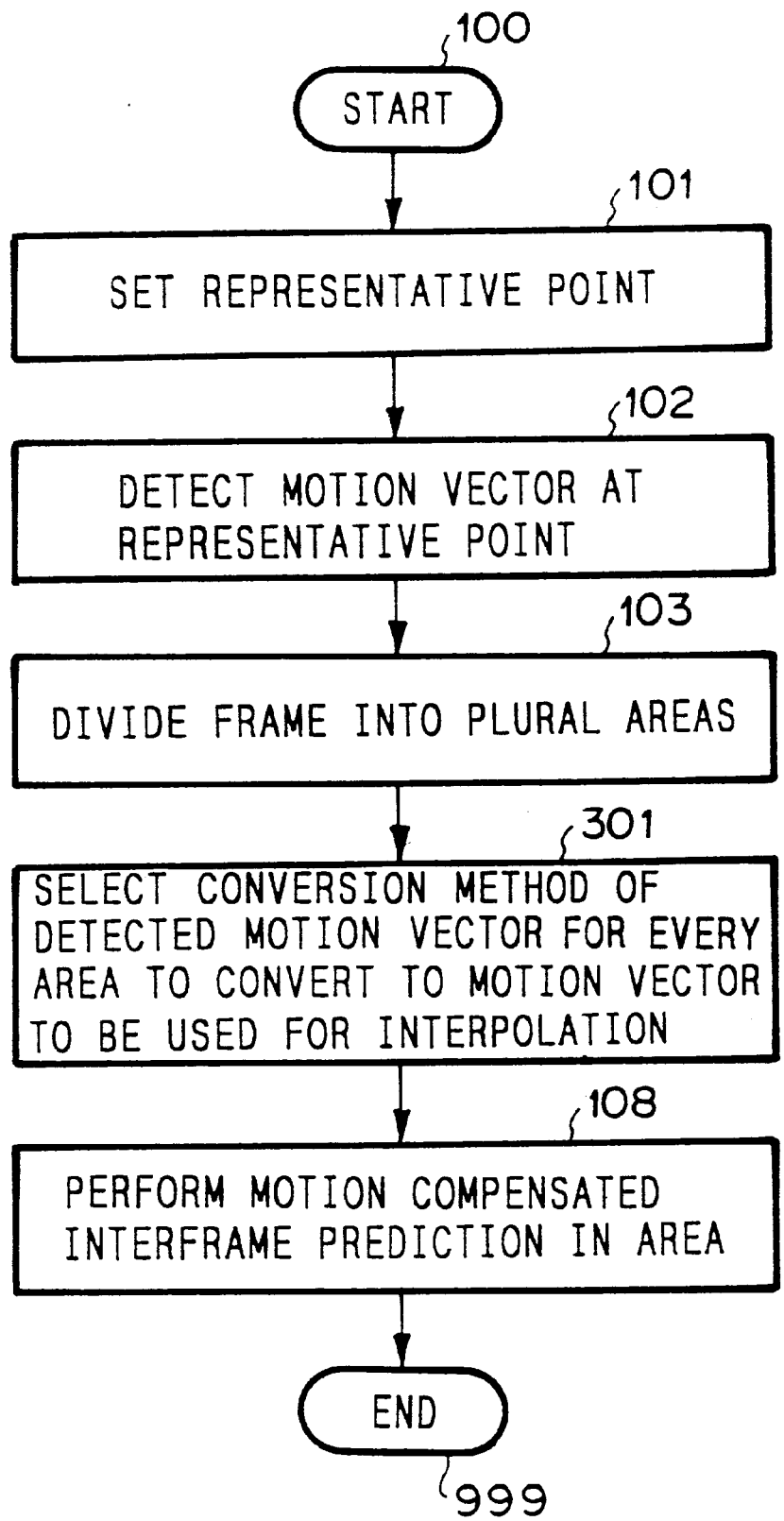

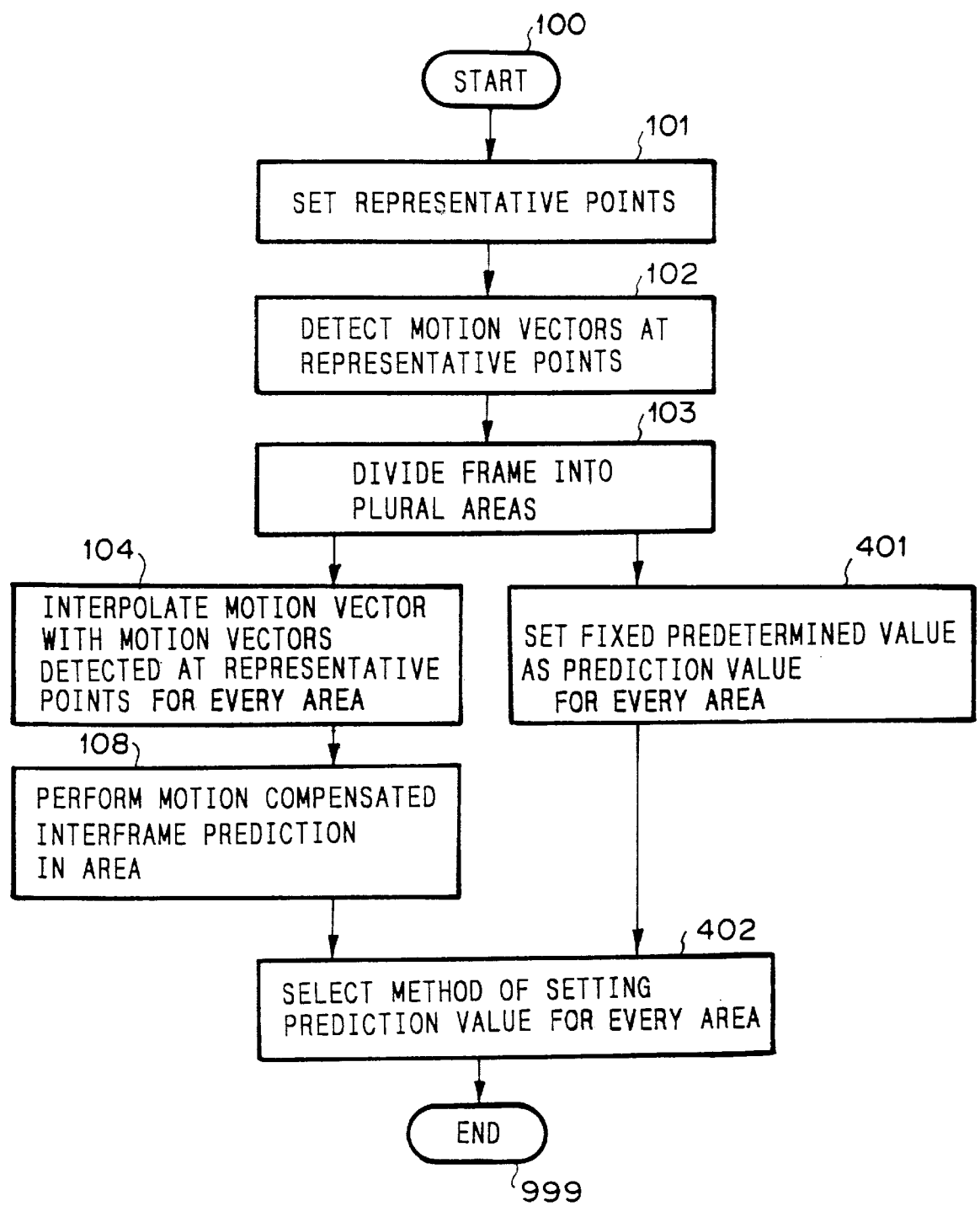

FIG. 8a
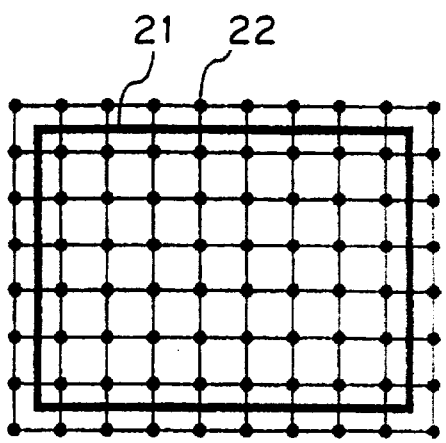
FIG. 8b
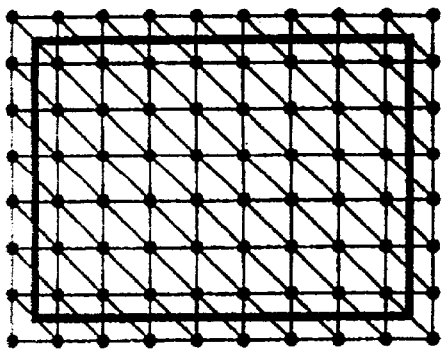
FIG. 8c
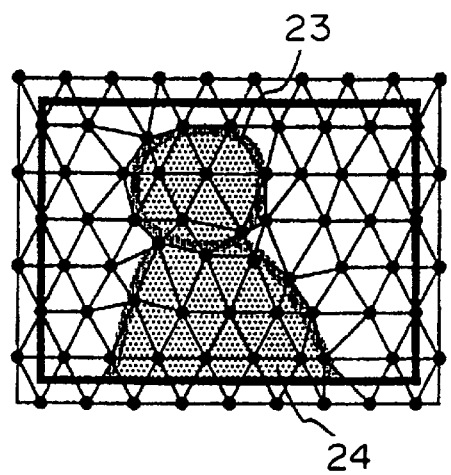
FIG. 8d
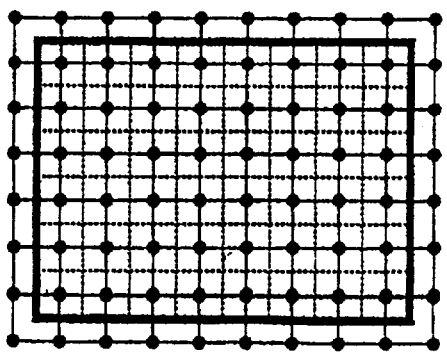
FIG. 8e
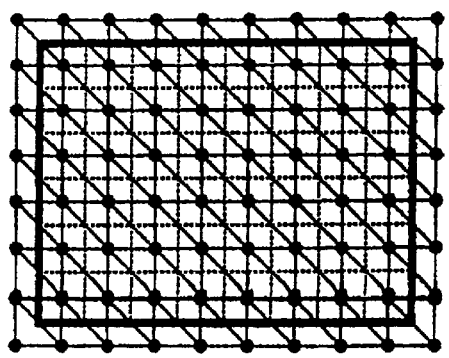
 DIVISIONAL AREA

ON REFERENCE FRAME IMAGE  ON CURRENT FRAME IMAGE

FIG.15a
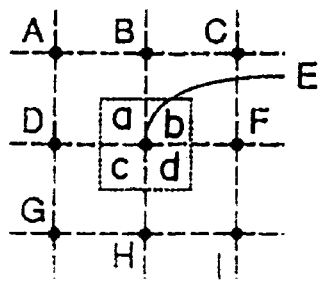
FIG.15b
FIG.15c
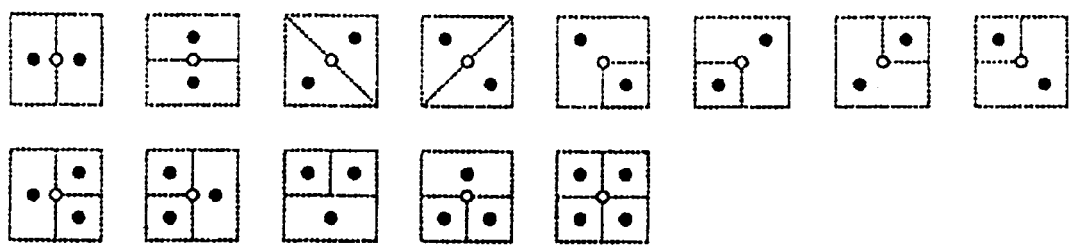
FIG.15d
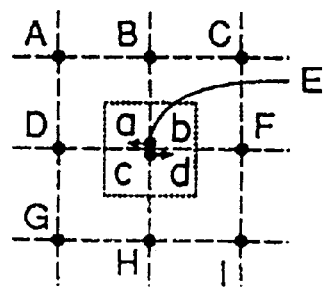

MOTION COMPENSATED INTERFRAME PREDICTION METHOD BASED ON ADAPTIVE MOTION VECTOR INTERPOLATION

BACKGROUND OF THE INVENTION

1. Field of the Invention

The present invention relates to a motion compensated interframe prediction method used to encode moving pictures, and particularly to a method for interpolating motion vectors at all pixel positions in a frame on the basis of motion vectors at plural predetermined representative points to perform an interframe prediction.

2. Description of the Related Art

As a motion compensated interframe prediction method for encoding moving pictures has been known a method in which prediction signals are generated by interpolating motion vectors at all pixel positions in a frame on the basis of motion vectors at plural predetermined representative points. Examples of this method are disclosed in "Very Low Bitrate Video Coder using Warping Prediction" by T. George Campbel, Eighth Image Coding Symposium (PCSJ93) of 1993, pp8–7 (document 1), in "Motion Compensation for Video Compression using Control Grid Interpolation" by Gray J. Sullivan and Richard L. Baker, The 1991 International Conference on Acoustics, Speech and Signal Processing: ICASSP91), M9.1 (document 2), and in "A Basic Study on motion compensation with Triangles" by Yuichiro Nakaya and Hiroshi Harashima, Technical Study Report of Image Engineering Research Group of Electronic Information Communication Engineering Society, IE90-106 (document 3). According to these methods, representative points are first set up in advance. After the motion vectors at these representative points are detected, an image is sectioned into triangular or quadrilateral cells (patches) by lines through which the representative points are linked to each other, and a motion vector at a pixel position in each cell (patch) is interpolated on the basis of the motion vectors detected at the corners (apexes) of the cell by a linear interpolation method. Finally, an interframe predicted value at each pixel is determined on the basis of the motion vectors thus obtained.

According to the conventional methods as described above, since the interpolation is performed so that the motion vector varies continuously, there is an advantage that no block distortion occurs, and not only the translation, but also other various motions such as zoom, rotation, etc. can be subjected to the interframe prediction and presented to motion image. However, these methods are not applicable to a case where variation of a motion vector is sharp, for example, at a boundary portion of an object undergoing locally quick motion or different types of motion. Therefore, in such a case, a user perceives such distortion as an object that is unnaturally deformed. Particularly, a picture which moves locally quickly is visually remarkable, and thus the distortion lowers the image quality.

SUMMARY OF THE INVENTION

An object of the present invention relates to a motion compensated interframe prediction method based on motion vector interpolation which can be applied to a locally quick motion or any portion in which a motion vector varies sharply.

In order to attain the above object, according to a first aspect of the present invention, a method for setting plural representative points at positions in a frame and at positions which are outside and in the neighborhood of the frame, detecting the motion vectors at the representative points to interpolate the motion vectors at all the pixel positions in the frame on the basis of the motion vectors at the representative points to thereby perform motion compensated interframe prediction for every pixel for the coding of moving pictures, is characterized by comprising the steps of dividing the frame into plural areas, and adaptively selecting, for every area, one of a method of interpolating the motion vector of each pixel on the basis of representative points on the boundary of each area and on the basis of representative points contained in a noted area and areas adjacent thereto and a method of detecting motion vectors of each area separately from the representative points which are referred to for the interpolation to perform the interpolation of the motion vector every area.

According to a second aspect of the present invention, a method for setting plural representative points at positions in a frame and at positions which are outside a frame and in the neighborhood of the frame, detecting the motion vectors at the representative points, and interpolating the motion vectors at all the pixel positions in the frame on the basis of the motion vectors at the representative points to thereby perform a motion compensated interframe prediction every pixel for the coding of moving pictures, is characterized by comprising the steps of dividing the frame into plural areas, and adaptively selecting, every area, one of a method of interpolating the motion vector of each pixel on the basis of representative points on the boundary of each area and on the basis of representative points contained in a noted area and areas adjacent thereto and a method of further dividing the noted area into subareas every area and interpolating the motion vector of each pixel in each subarea by using representative points which are contained in the subarea and adjacent to the subarea.

According to a third aspect of the present invention, a method for setting plural representative points at positions in a frame and at positions which are outside and in the neighborhood of the frame, detecting the motion vectors at the representative points, and interpolating the motion vectors at all the pixel positions in the frame on the basis of the motion vectors at the representative points to thereby perform a motion compensated interframe prediction every pixel for the coding of moving pictures, is characterized by comprising the steps of dividing the frame into plural areas, beforehand preparing plural methods of selecting representative points located on the boundary of each area and representative points contained in a noted area and areas adjacent thereto and temporarily converting the values of motion vectors detected at the selected representative points into values to be used for interpolation processing of the motion vectors, adaptively selecting one of the plural conversion methods for the motion vectors every area, temporarily converting the values of the motion vectors detected at the selected representative points into values to be used for the motion vector interpolating processing for a noted area according to the selected conversion method every area, and interpolating the motion vector of each pixel according to a predetermined method by using the converted motion vectors.

According to a fourth aspect of the present invention, a method for setting plural representative points at positions in a frame and at positions which are outside and in the neighborhood of the frame, detecting the motion vectors at the representative points and interpolating the motion vectors at all the pixel positions in the frame on the basis of the motion vectors at the representative points to thereby perform a motion compensated interframe prediction every pixel for coding of moving pictures, is characterized by comprising the steps of dividing the frame into plural areas, and adaptively selecting, every area, one of a method of interpolating the motion vector of each pixel on the basis of representative points on the boundary of each area and on the basis of representative points contained in a noted area and areas adjacent thereto and setting a value of the motion compensated interframe prediction and a method of setting as a prediction value a fixed value which is predetermined every area.

According to the present invention, in the interframe prediction of the moving pictures, the motion vector interpolating method is partially and adaptively switched, so that the interframe prediction processing can be performed in accordance with the local image quality.

The operation of the present invention will be described with reference to FIGS. 1a to 1g.

There is now considered a method of a motion compensated interframe prediction method of predicting a current image as shown in FIG. 1b from a reference image as shown in FIG. 1a. According to the conventional method as disclosed in the document 1, a grid structure as shown in FIG. 1c is set for the current image, and representative points are set on the grids to detect the motion vectors at the representative points. Consequently, the corresponding operation of the grid structure is performed on the reference image as shown in FIG. 1d. When the prediction is performed on the basis of the corresponding grid relationship as described above, a prediction image as shown in FIG. 1e is obtained. At this time, a subject which moves locally quickly cannot be sufficiently predicted, and thus a prediction error is large. Further, at a boundary portion between subjects undergoing different types of motion, deformation in shape (i.e., "distortion") occurs.

According to the first aspect of the present invention, when a grid structure as shown in FIG. 1c is set, each area (patch) which is sectioned by the grid structure is set as an unit area for prediction processing. Further, there is adaptively selected any one of a method of interpolating motion vectors for every area according to a linear interpolation to perform a motion compensated interframe prediction as described above and a method of detecting other motion vectors separately from the above motion vectors for every area to perform the motion compensated interframe prediction for a noted area on the basis of only the separately detected motion vectors. In FIG. 1g, the motion vectors are separately detected in meshed patches, and then the motion compensated interframe prediction is performed by referring to the corresponding portion of FIG. 1f. According to this system, the high-precision prediction can be performed for a subject having locally quick motion and a boundary portion between subjects having different types of motion.

Further, according to the second aspect of the present invention, when the grid structure shown in FIG. 1c is set, each patch sectioned by the grid is set as a unit area for the prediction processing, and there is adaptively selected for every area, one of the method of interpolating the motion vector by the conventional linear interpolation method as described above for every area to perform the motion compensated interframe prediction and the method of further dividing the noted area into subareas and performing, for every subarea, the motion compensated interframe prediction by using the motion vectors at the representative points which are adjacent to the subarea. For example, as shown in FIG. 2b, two areas CDFE and ABDC are further divided into subareas 14 and 15, and 16 and 17. In these areas, the motion vector interpolating processing is performed by using only the representative points which are adjacent to the subarea. In this case, the motion vectors at the points C and E are used for the subarea (subpatch) 14, and the motion vectors at the points D and F are used for the subarea (subpatch) 15. Further, in combination of the first aspect of the present invention, the motion vectors at the points A and C are used for the subarea 16, and the motion vector is separately detected for the subarea 17 to perform the motion compensated interframe prediction. According to this system, a quick motion (sharp variation) at the boundary portion between subareas can be represented, and thus the "deformation distortion" problem of the prior art can be overcome.

According to the third aspect of the present invention, when the grid structure shown in FIG. 1c is set, each patch sectioned by the grid structure is set as an unit area for the prediction processing, plural methods of temporarily converting the values of the detected motion vectors for the representative points used for the motion vector interpolation into the values used for only the motion vector interpolating processing are prepared in advance, and one of the conversion methods is adaptively selected for every area. For example, there are beforehand prepared some methods of replacing the values of the motion vectors with one another. In the case of FIG. 2d, according to the conventional method, the motion vectors detected at the points A, B, C and D are directly used for the motion vector interpolation. On the other hand, according to the present invention, there is selected a method of directly using the motion vectors detected at the points A and C for the interpolation processing for the points A and C, however, substituting the motion vector detected at the point A for the motion vector to be used for the interpolation for the point B and substituting the motion vector detected at the point C for the motion vector to be used for the interpolation for the point D to thereby temporarily convert the motion vectors to other motion vectors by the selected method to thereby perform the motion vector interpolation in an area. This convention is temporarily used for only the interpolation processing of the motion vector in the noted area, and the value of the converted motion vector has no effect on the interpolation processing of the motion vector in other adjacent areas. Likewise, for the area 19, there is selected a method of directly using the motion vectors detected at the points C and E for the interpolation processing for the points C and E, however, substituting the motion vector detected at the point C for the motion vector to be used for the interpolation for the point D and substituting the motion vector detected at the point E for the motion vector to be used for the interpolation for the point F to thereby temporarily convert the motion vectors to other motion vectors by the selected method to thereby perform the motion vector interpolation in an area. According to this system, the motion vector interpolation can be performed without using any inappropriate motion vector in an indicated area and the high prediction can be performed.

According to the fourth aspect of the present invention, when the grid structure shown in FIG. 1c is set, each patch sectioned by the grid structure is set as an unit area, and one of a method of performing the motion compensated interframe prediction for every area by the conventional method and a method of setting as a prediction value a fixed value which is predetermined in a noted area, is adaptively selected. For example, as shown in FIG. 2e, a portion having a large prediction error is judged as "prediction impossible", and the prediction values of the patches of the portion are set to a preset value. When the coding system of moving pictures by coding the prediction error after this prediction processing is performed, the accurate image reproduction can be performed by coding the signal values of an original image in an area for which the preset value is set as the prediction value.

These and other objects, features and advantages of the present invention will become more apparent in light of the following detailed description of best mode embodiments thereof, as illustrated in the accompanying drawings.

BRIEF DESCRIPTION OF THE DRAWINGS

FIGS. 1a to 1g are diagrams showing the operation of the present invention;

FIG. 3 is a diagram showing the detailed part of a flowchart for an embodiment of a motion compensated interframe prediction method according to a first aspect of the present invention;

FIG. 4 is a diagram showing the detailed part of a flowchart of an embodiment of a motion compensated interframe prediction method according to a second aspect of the present invention;

FIG. 5 is a diagram showing the detailed part of a flowchart of an embodiment of a motion compensated interframe prediction method according to a third aspect of the present invention;

FIG. 6 is a diagram showing the detailed part of a flowchart of an embodiment of a motion compensated interframe prediction method according to a fourth aspect of the present invention;

FIGS. 8a to 8e are diagrams showing an arranging method of representative points;

FIGS. 15a to 15d are diagrams showing an interpolating method.

DETAILED DESCRIPTION OF THE PREFERRED EMBODIMENTS

Figure 2A:
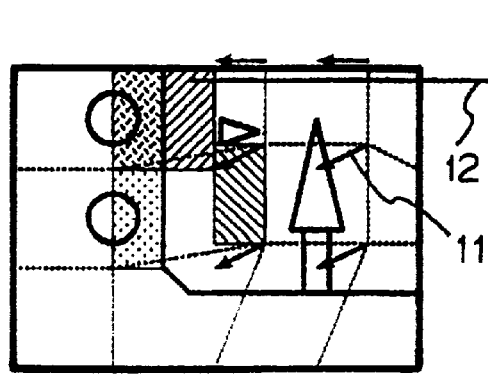
FIGS. 2a to 2e are diagrams showing the operation of the present invention.
Figure 2B:
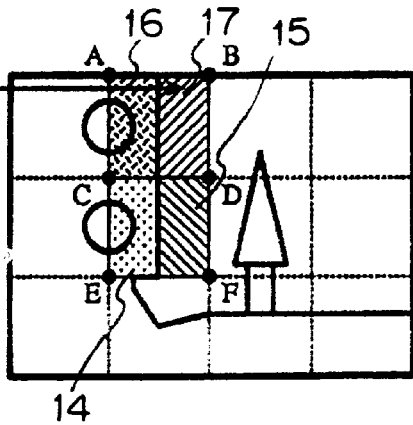
Figure 2C:
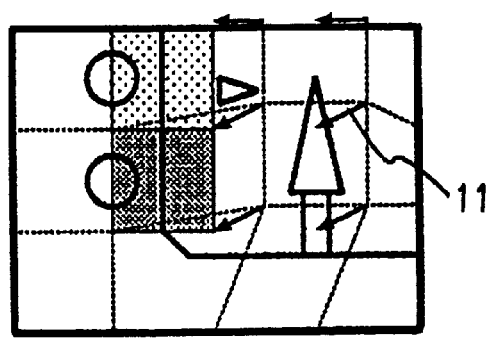
Figure 2D:
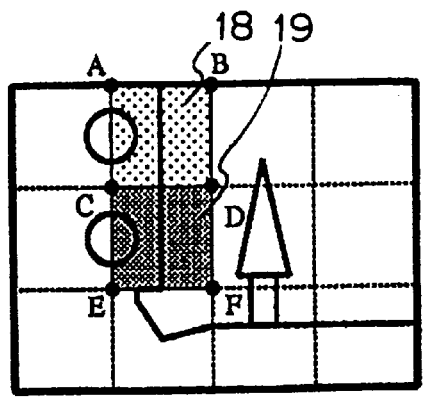
Figure 2E:
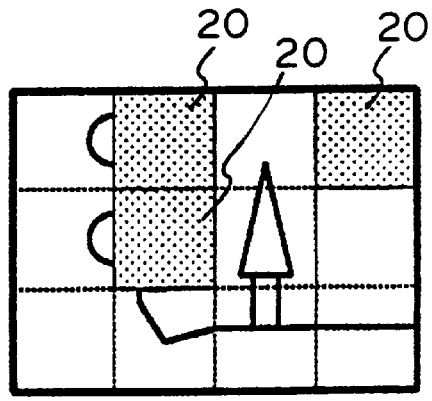

Preferred embodiments according to the present invention will be described with reference to the accompanying drawings.

FIG. 3 is a flowchart showing a processing procedure and means of embodying each processing step according to a first aspect of the present invention.

First, in a representative point setting means 101, representative points at which motion vectors are detected are set, and then in a means 102 for detecting the motion vectors at representative points, the motion vectors at the representative point positions thus set are detected. Thereafter, in a means 103 for dividing a frame into plural areas, the frame is divided into unit areas (patches) for which a motion vector interpolating method is adaptively selected. In a means 104 for interpolating motion vectors for every area by using the motion vectors which are detected at the representative points, the motion vector interpolation is performed by using all the representative points located at a boundary line of each divided area or all representative points contained in a noted area and areas adjacent thereto according to the method as described in "Description of the Related Art". Further, in a means 105 for separately detecting motion vectors applied to only a noted area independently of the representative points used for the interpolation, the motion vectors are detected independently of the representative points used for the interpolation. In a means 106 for interpolating the motion vectors by the method using the motion vectors which are separately detected for every noted area, the motion vector interpolation is performed by using the motion vectors which are separately detected. In a means 107 for selecting the motion vector interpolating method for every area, one of the two methods with which the motion vector interpolation should be performed is adaptively selected for every area. Finally, in a means 108 for performing the motion compensated interframe prediction in an area, an interframe prediction image is generated according to the method selected by the means 107.

FIG. 4 is a flowchart showing a processing procedure and means for embodying each processing step according to a second aspect of the present invention.

First, in a representative point setting means 101, representative points at which motion vectors are detected are set, and then in a means 102 for detecting the motion vectors at representative points, the motion vectors at the representative points thus set are detected. Thereafter, in a means 103 for dividing a frame into plural areas, the frame is divided into unit areas (patches) for which a motion vector interpolating method is adaptively selected. In a means 104 for interpolating motion vectors for every area by using the motion vectors which are detected at the representative points, the motion vector interpolation is performed by using all the representative points located at a boundary line of each divided area or all representative points contained in a noted area and areas adjacent thereto according to the method as described in "Description of the Related Art". In a means 201 for further dividing the noted area into subareas, the noted area is further divided in a predetermined divisional pattern. In a means 202 for interpolating a motion vector by a method using motion vectors to which a divisional subarea is contacted, for every subarea divided by the means 201, the motion vector interpolation is performed by using only the motion vectors on the subarea. In a means 107 for selecting the motion vector interpolating method for every area, one of the two methods with which the motion vector interpolation should be performed as described above is adaptively selected. Finally, in a means 108 for performing the motion compensated interframe prediction in an area, an interframe prediction image is generated according to the method selected by the means 107.

FIG. 5 is a flowchart showing a processing procedure and means for embodying each processing step according to a third aspect of the present invention.

First, in a representative point setting means 101, representative points at which motion vectors are detected are set, and then in a means 102 for detecting the motion vectors at representative points, the motion vectors at the representative point positions thus set are detected. Thereafter, in a means 103 for dividing a frame into plural areas, the frame is divided into unit areas (patches) for which a motion vector interpolating method is adaptively selected. In a means 301 for selecting a conversion method of the detected motion vector for every area to convert to the values of the motion vectors used for the interpolation processing, a method of converting the values of the motion vectors detected at the representative points used for the motion vector interpolation of the noted area to the values used for only the motion vector interpolating processing is adaptively selected for every area from plural methods which are prepared in advance to temporarily convert the motion vectors detected at the representative points to the values of the motion vectors used for the interpolating processing of the area. In a means 108 for performing the motion compensated interframe prediction in an area, an interframe prediction image is generated by using the motion vectors which are temporarily converted by the means 301.

FIG. 6 is a flowchart showing the processing procedure and means for embodying each processing step according to a fourth aspect of the present invention.

First, in a representative point setting means 101, representative points at which motion vectors are detected are set, and then in a means 102 for detecting the motion vectors at representative points, the motion vectors at the representative points thus set are detected. Thereafter, in a means 103 for dividing a frame into plural areas, the frame is divided into unit areas (patches) for which a motion vector interpolating method is adaptively selected. In a means 104 for interpolating motion vectors for every area by using the motion vectors which are detected at the representative points, the motion vector interpolation is performed by using all the representative points located at a boundary line of each divided area or all representative points contained in a noted area and areas adjacent thereto according to the method as described in "Description of the Related Art". In a means 108 for performing the motion compensated interframe prediction in an area, an interframe prediction image is generated according to the method of the means 104. In a means 401 for setting as a prediction value a fixed value which is predetermined for every area, the noted area is filled with a value irrespective of the detected motion vector. In a means 402 for selecting a method for setting the prediction value every area, one of the two methods with which the prediction value should be set as described above is adaptively selected for every area, and the interframe prediction image is generated according to the selected method.

Each processing means will be described individually hereunder in detail.

Arrangement of representative points

Figure 7A:
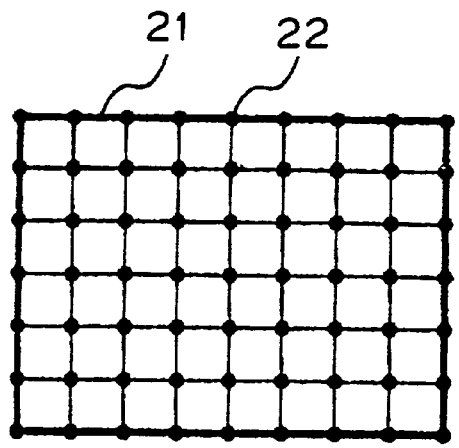
FIGS. 7a to 7d are diagrams showing an arrangement of representative points.
Figure 7B:
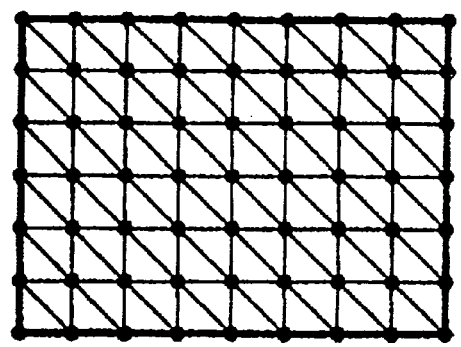

A method of determining the arrangement of representative points at which the motion vector detection is performed in the means 101 for setting the representative points. FIGS. 7a to 7d show an example of the arrangement of the representative points which are set in this processing. FIG. 7a and 7b show arrangements in which the representative points are located at apexes of rectangular blocks.

Figure 7C:
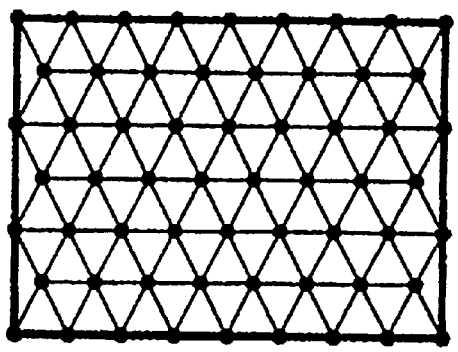
Figure 7D:
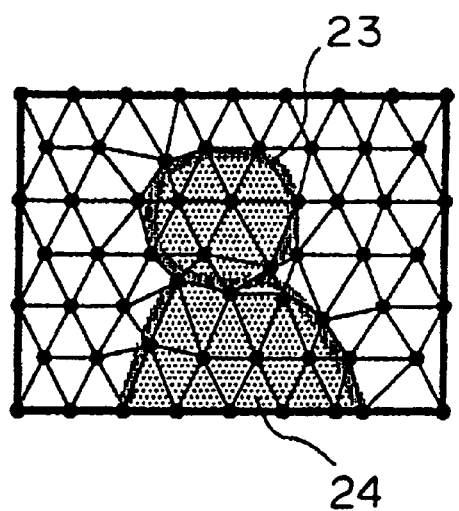

The frame may be sectioned by linking the representative points in a quadrilateral form and then locating the representative points at the apexes of each quadrilateral block or by adding a diagonal line to each quadrilateral block of FIG. 7a and locating the representative points at the apexes of each triangular block as shown in FIG. 7b. Alternatively, the representative points may be arranged in a triangular grid structure as shown in FIG. 7c. Further, it may be adopted that the arrangement of the representative points as described above is set as an initial arrangement and the initial arrangement is subjected to correction processing so as to be changed to an arrangement having a deformed cell structure. For example, as shown in FIG. 7d, an outline 23 may be detected from the frame, and the positions of the representative points may be corrected so that the boundary lines of the cells 24 meet the detected outline. As described above, the arrangement may be fixed for all the images to be processed, or it may be individually set for each image. Further, as shown in FIG. 8a to 8c, representative points 22 may be disposed outside the frame 21.

Detection of motion

Next, a method for detecting the motion vectors at the representative point positions set as described above in the means 102 for detecting the motion vectors at the representative points will be described. A block matching method may be used for the detection of the motion vectors. A rectangular block having a fixed size may be used as a target area for matching. When the representative point position is subjected to the matching by tracing between frames, a block matching in which a position is more greatly weighted as the position is nearer to the representative point position may be used. For example, representing the representative point position by $(x_0, y_0)$, and representing a matching estimation range by $R=\{(x,y)|x_1 \leq x \leq x_2, Y_1 \leq y \leq y_2\}$, the weight w at the estimation position (x,y) is defined as follows:

$$w(x,y) = b_s - (|x-x_0| + |y-y_0|) \quad (1)$$

Here, $b_s = \max\{|x_1-x_0|+|y_1-y_0|, |x_1-x_0|+y_2-y_0|, |x_2-x_0|+|y_1-y_0|, |x_2-x_0|+|y_2-y_0|\}$. As a weighing method, any weighing efficient map may be set in an area of the matching estimation range. The weighing method is not limited to the above method.

The motion vector detection is performed by selecting a vector which provides the minimum matching prediction error from predetermined candidate vectors. That is, representing a current frame image by C(x,y) and a reference frame image by P(x,y), a prediction error amount Err ($V_x$, $V_y$) when a candidate vector ($V_x$, $V_y$) is selected is estimated as follows:

$$Err(V_x, V_y) = \sum_{(x,y) \in R} (C(x,y) - P(x+v_x, y+v_y))^2 \times w(x,y) \quad (2)$$

In the equation (2), R represents the matching estimation range, and w(x,y) is identical to w(x,y) of the equation (1). The estimation may be estimated by using an absolute sum value in place of the sum of squares to reduce a calculation load as follows:

$$Err(V_x, V_y) = \sum_{(x,y) \in R} |C(x,y) - P(x+v_x, y+v_y)| \times w(x,y) \quad (3)$$

Alternatively, when triangular cells (patch) are used, a hexagonal area obtained by linking triangular patches adjacent to a noted representative point may be used as an estimation target area R of the block matching. However, the estimation target area R on the peripheral portion of the frame is not limited to a hexagonal shape. Likewise, even when quadrilateral patches are used, an area obtained by linking quadrilateral patches adjacent to a noted representative point may be used. Further, when representative points outside of the frame are required to be referred to, this requirement may be satisfied by repetitively extrapolating the values at the edge of the frame.

Furthermore, the motion vector which is detected by the matching method may be re-corrected by considering the prediction result. For example, a motion vector re-search range which contains the motion vector detected by the matching method at the center thereof is first set, a motion compensated prediction error in all the patch areas which are adjacent to the noted representative point is estimated for candidate vectors in the research range, and a candidate vector which provides the minimum error is detected as a motion vector.

With respect to the motion vectors at representative points which are arranged outside the frame, the magnitude of the vectors may be set to zero at all times, or it may be set to the same value as the motion vector which is located at the edge position of the frame and is most proximate to these vectors. Or, the motion detection may be performed by the same method as described above. However, when the motion detection is performed by the same method as described above, the estimation range must be set to be large to the extent that it contains sufficient pixels in the frame.

Division of Frame

In the means 103 for dividing the frame into plural areas, an unit area for which the motion vector interpolating method is adaptively determined is set. For example, as shown in FIG. 7a to FIG. 7d, the frame is divided so that a rectangular or triangular patch (block) obtained by linking representative points is directly set as an area. Besides, the same frame division as shown in FIG. 7a may be performed so that a square area obtained by linking two right-angled triangles having a common oblique side is set as a unit area in FIG. 7b. In the arrangement shown in FIGS. 8a and 8b, the frame may be divided so that each representative point is located at the center of each area as shown in FIGS. 8d and 8e. Here, in FIG. 8d and 8e, a quadrilateral area which is sectioned by a dotted line represents a divisional area. Further, when the representative point arrangement is changed as shown in FIG. 8c, a Voronoi division may be performed by setting the representative points as master points.

Notion vector interpolation

Figure 9:
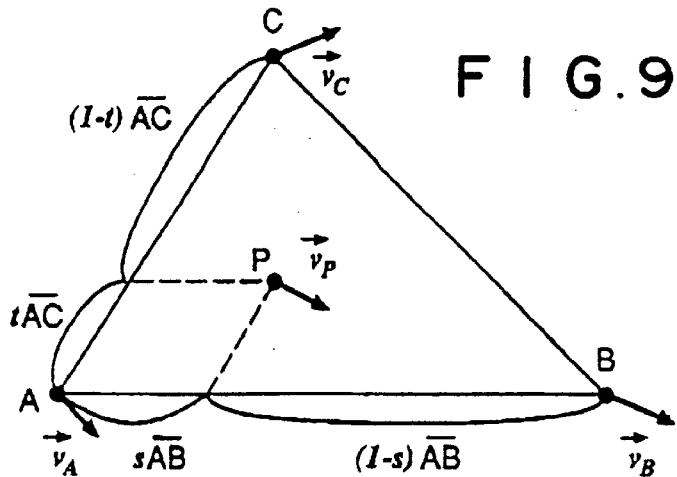
FIG. 9 is a diagram showing a method of calculating a motion vector in a triangular patch by a linear interpolation method.

The method of the means 104 for interpolating a motion vector by using the motion vectors detected at the representative points for every area will be described. According to the "interpolating method" used in the following description, the interpolation processing is performed for every patch (block) which is partitioned by lines connecting representative points. For example, when triangular patches are used, a motion vector at each pixel in a patch is linearly interpolated from the motion vectors at the three apexes of the patch. For example, as shown in FIG. 9, the motion vector (VP) at a point P in a triangle ABC can be calculated from the three motion vectors at the three apexes (VA, VB,VC) as follows:

$$VP = (1-s-t) \cdot VA + s \cdot VB + t \cdot VC \tag{4}$$

As described above, the motion vectors at all the pixel positions in the patch are interpolated to obtain the motion compensated position every pixel.

Figure 10:
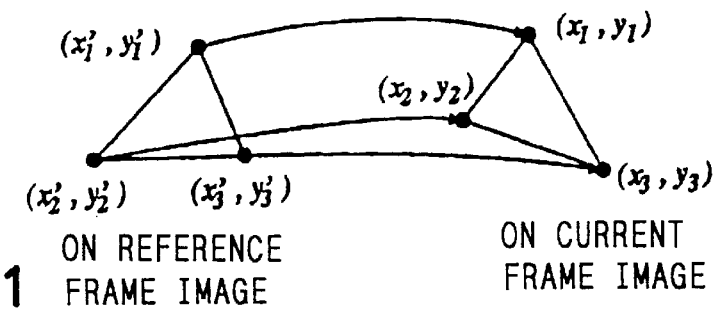
FIG. 10 is a diagram showing a method of performing a motion compensated prediction by a mapping of triangular patches.

Another method of obtaining the motion compensated position every pixel will be described with reference to FIG. 10.

According to this method, a mapping of corresponding triangles is performed between frames, and the corresponding relationship is represented by an Affine transform. In this method, Affine transform parameters for a noted triangular patch are calculated on the basis of the relationship of the three pairs of corresponding apex positions. The motion compensated position of a pixel in the triangular patch is calculated from the Affine transform parameters.

A calculation method of the motion compensated position when the Affine transform is used will be described.

In a two dimensional Affine transform, a motion compensated position (x', y') on a reference image which corresponds to a position (x,y) on a current image is represented by six parameters a to f as shown in the following equation (5):

$$\begin{pmatrix} x' \\ y' \end{pmatrix} = \begin{pmatrix} a & b \\ c & d \end{pmatrix} \begin{pmatrix} x \\ y \end{pmatrix} + \begin{pmatrix} e \\ f \end{pmatrix} \tag{5}$$

Here, representing the three apex positions of a triangle by $(x_1, y_1)$, $(x_2, y_2)$ and $(x_3, y_3)$, and representing the three apex positions on the reference image corresponding to the triangle by $(x'_1, y'_1)$, $(x'_2, y'_2)$ and $(x'_3, y'_3)$, the following equation (6) is satisfied:

$$\begin{pmatrix} x'_1 & x'_2 & x'_3 \\ y'_1 & y'_2 & y'_3 \end{pmatrix} = \begin{pmatrix} a & b & e \\ c & d & f \end{pmatrix} \begin{pmatrix} x_1 & x_2 & x_3 \\ y_1 & y_2 & y_3 \\ 1 & 1 & 1 \end{pmatrix} \tag{6}$$

The parameters can be calculated by solving the above equation as follows:

$$\begin{pmatrix} a & b & e \\ c & d & f \end{pmatrix} = \begin{pmatrix} x'_1 & x'_2 & x'_3 \\ y'_1 & y'_2 & y'_3 \end{pmatrix} \begin{pmatrix} x_1 & x_2 & x_3 \\ y_1 & y_2 & y_3 \\ 1 & 1 & 1 \end{pmatrix}^{-1} \tag{7}$$

The motion compensated position of the pixel in the triangle is calculated from the calculated Affine transform parameters a to f according to the equation (5).

Figure 11:
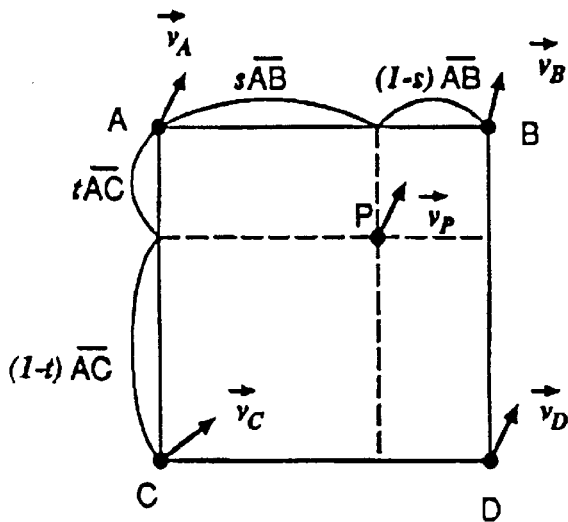
FIG. 11 is a diagram showing a method of calculating a motion vector in a quadrilateral patch by a linear interpolation method.

Further, when rectangular patches are used, the motion vector at each pixel position in a rectangular patch is linearly interpolated from the motion vectors at the four apexes of the rectangular patch. For example, as shown in FIG. 11, the motion vector VP at a point P in a rectangle ABDC is calculated from the motion vectors (VA, VB, VC, VD) at the four apexes as follows:

$$VP = (1-s) \cdot (1-t) \cdot VA + s \cdot (1-t) \cdot VB + (1-s) \cdot t \cdot VC + s \cdot t \cdot VD \tag{8}$$

The motion compensated position is obtained for every pixel as described above, and the pixel value at the motion compensated position on the reference image is set as an interframe prediction value. The value of a pixel which is not located on a sample point on the reference image is calculated by the linear interpolation. Representing the pixel value at (x',y') by P(x',y') and assuming that $x_0=[x']$, $y_0=[y']$, $\alpha=x'-[x']$, $\beta=y'-[y']$, the interpolation is calculated as follows:

$$P(x',y') = (1-\alpha) \cdot (1-\beta) \cdot P(x_0, y_0) + \alpha \cdot (1-\beta) \cdot P(x_0+1, y_0) + (1-\alpha) \cdot \beta \cdot P(x_0, y_0+1) + \alpha \cdot \beta \cdot P(x_0+1, y_0+1) \tag{9}$$

Here, [x] represents the maximum integer which does not exceed x.

The prediction values at all the pixel positions in a patch are calculated as described above to generate and output a prediction signal in the patch.

Even when patches which are sectioned by the lines linking the representative points are not coincident with divisional areas as shown in FIGS. 8d and 8e, with respect to the motion compensated interframe prediction, the processing is performed by using as a processing unit each patch which is sectioned by the lines linking the representative points. For example, when a divisional area represented by a rectangle indicated by a dotted line is set in a frame which is sectioned by a grid indicated by a broken line as shown in FIG. 15a, a noted area is divided into four equal subareas a, b, c and d by the broken line, and each of these subareas is processed according to the motion vector interpolating method corresponding to a patch to which the subarea belongs. That is, the motion vector interpolation for the subarea a is performed on the basis of the motion vectors at the representative points A, B, D and E, the motion vector interpolation for the subarea b is performed on the basis of the motion vectors at the representative points B, C, E and F, the motion vector interpolation for the subarea c is performed on the basis of the motion vectors at the representative points D,E,G and H, and the motion vector interpolation for the subarea d is performed on the basis of the motion vectors at the representative points E,F,H and I.

Motion vector interpolating method according to the first aspect of the present invention The method of the means 105 for detecting a motion vector which is applied to only the noted area will be described.

The same method as the means 102 for detecting the motion vectors at the representative points can be used as the motion detecting method. The motion vector which is suitable for the noted area is detected by setting the estimation range for the prediction error at this time as the area concerned.

The means 106 for interpolating the motion vector according to the method using the motion vectors which are separately detected every noted area will be described. First, the case where the area division is performed with the lines linking representative points in the representative point arrangement shown in FIGS. 7a to 7d will be described. In this case, the following method is adopted.

(1) The motion vectors at the pixel positions in the area concerned are uniformly interpolated on the basis of a separately detected motion vector.

Figure 13A:
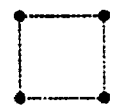
FIGS. 13a to 13e are diagrams showing an interpolating method.
Figure 13B:
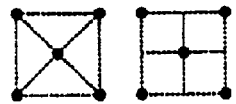
Figure 14A:
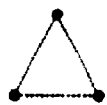
FIGS. 14a to 14e are diagrams showing an interpolating method.
Figure 14B:
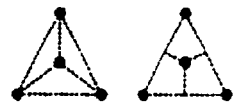

(2) The motion vector which is separately detected is assumed as the motion vector at the center of gravity of the area concerned, and the area is sectioned into subareas by each line which connects the center of gravity and each apex of the area or connects the center of gravity and each middle point of each side of the area. The motion vector interpolation is performed for every subarea on the basis of the motion vectors at the apexes of the patch by the linear interpolation processing. The actual examples of this method are shown in FIG. 13b and FIG. 14b. A representative point is added at the center of gravity of a divisional area shown in FIG. 13a or FIG. 14a to further section the patch.

(3) A part of the motion vectors at the apexes of the area concerned is replaced by the separately detected motion vectors to perform the linear interpolation processing of the motion vector.

Next, the case where the area division is performed so that the representative point is disposed at the center of the area in the representative point arrangement of FIGS. 8a to 8e will be described. In this case, the following method is adopted.

(1) Only one motion vector is detected separately, and the motion vectors at the pixel positions in the area concerned are uniformly interpolated by the separately detected motion vector.

(2) Plural motion vectors are separately detected, and the motion vectors at the pixel positions in the area concerned are linearly interpolated by the separately detected motion vectors. For example, the motion vectors at the apexes of the area concerned are detected, and any motion vector inside the area concerned is calculated from these motion vectors by the interpolation. Alternatively, when the area is rectangular, the area is further divided into four equal subareas. The motion vector at the center of each subarea is detected, and the motion vector at any position inside the subarea is interpolatively calculated. An example of this method is shown in FIG. 15b. A white dot in FIG. 15b represents a representative point at which the motion vector is first detected, and which is not used for the interpolation of the motion vectors in a noted area. A black dot in FIG. 15b represents a representative point at which the motion vector is newly detected, and which is used for the interpolation of the motion vectors in the area.

Here, when the linear interpolation is performed with the motion vectors at only the two representative points, the linear interpolation can be performed by calculating a weighing average based on the distances from the two representative points. For example, when the motion vector VP at a point P is calculated from the motion vectors VA,VB at representative points, VP can be calculated as follows:

$$VP=(1-s)\cdot VA+s\cdot VB \qquad (10)$$

Further, when the interpolation is performed by the motion vector at only one representative point, motion vectors in an area are uniformly interpolated by the motion vector.

Motion vector interpolating method according to the second aspect of the present invention The method of the means 201 for further dividing the noted area will be described.

Figure 13C:
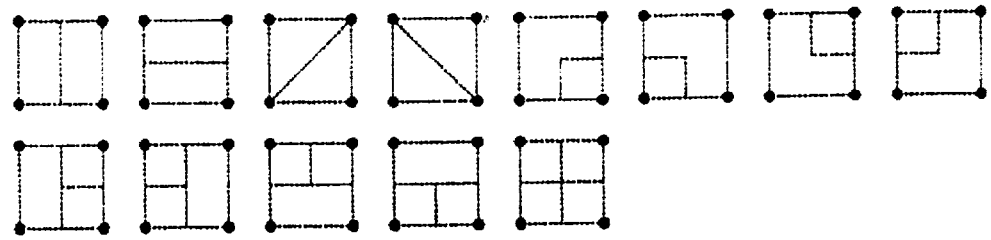
Figure 13D:
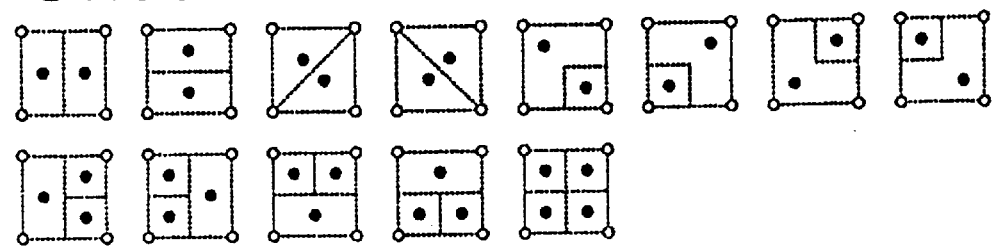
Figure 13E:
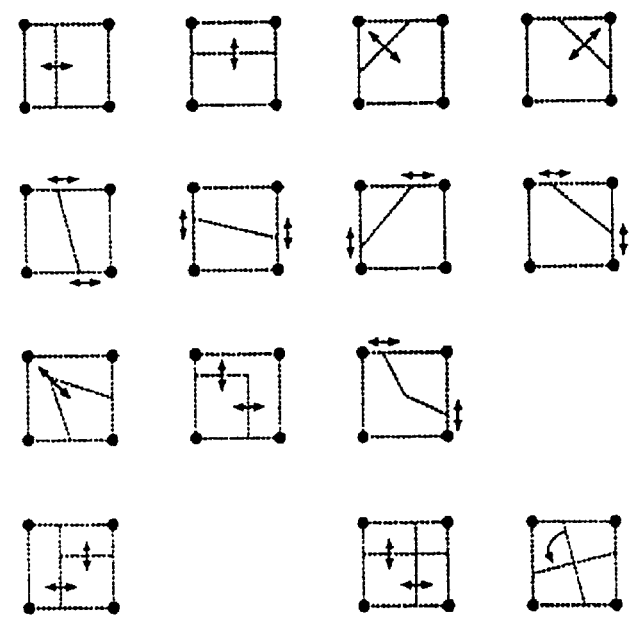
Figure 14C:
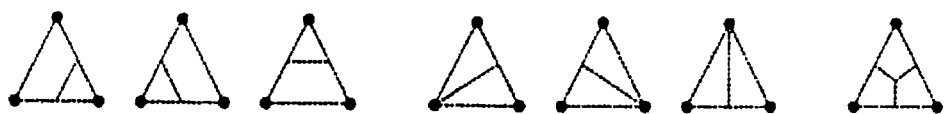
Figure 14D:
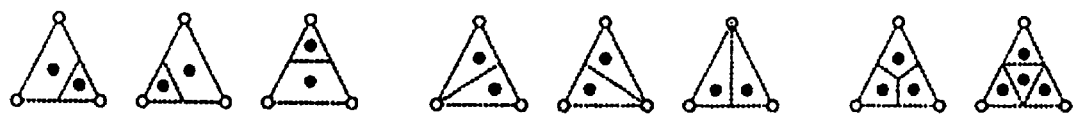
Figure 14E:
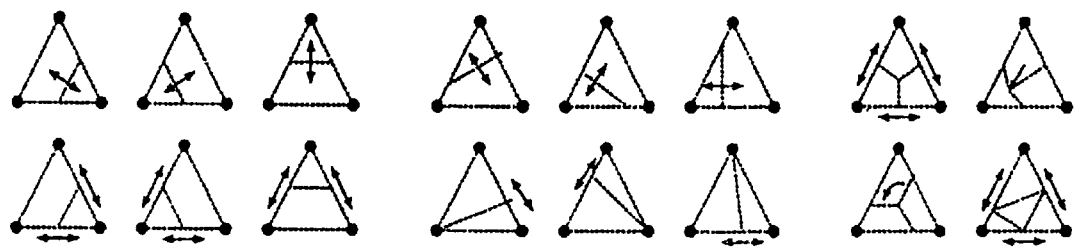

Specific divisional patterns which are prepared in advance may be used for the area division as shown in FIG. 13c and FIG. 14c. The pattern representation can be realized by giving codes for discriminating the respective patterns from one another. Alternatively, a pattern obtained by deforming a specific pattern with parameters as shown in FIG. 13e and FIG. 14e may be used. In these figures, various divisional patterns may be generated by shifting the boundary line as indicated by an arrow in each divisional pattern. In this case, The divisional status of each of the divisional patterns can be represented by using the basic pattern, the shift direction and the shift amount as parameters. In place of these methods, the area may be arbitrarily divided on a pixel basis. In this case, dividing lines are described with chain codes.

Next, the method of the means 202 for performing the motion vector interpolation every subarea by the method using the motion vectors at the representative points to which the area is adjacent will be described. In this case, there is the following method.

Figure 12:
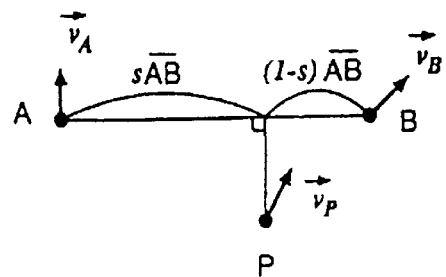
FIG. 12 is a diagram showing a method of calculating motion vectors at other pixels on the basis of the motion vectors at two pixels.

(1) The interpolation of the motion vectors in each subarea is performed by using the representative points adjacent to the area. The example of this method is shown in FIG. 13c and FIG. 14c. In this case, the number of the adjacent representative points is set to various numbers such as four, three or two, and the prediction may be performed according to the equation (8) of FIG. 11, the equations (4), (5) of FIG. 9 and FIG. 10, and the equation (10) of FIG. 12 for the respective cases. When only one representative point is adjacent to the area, the motion vectors in the area may be uniformly interpolated by the motion vector at the representative point.

(2) In combination with the first aspect of the present invention, a motion vector which indicates the motion of a subarea is detected separately from the motion vectors which are detected at the apexes of the subarea, and the motion vector interpolation in the subarea is uniformly performed on the basis of the detected motion vector. The actual examples of this method is shown in FIG. 13d, FIG. 14d and FIG. 15c. In these figures, a white dot represents a representative point at which the motion vector is first detected, and which is not used for the motion vector interpolation in the noted area. A black dot represents a subarea for which the motion vector is newly detected, and the vector detection is performed for subarea.

(3) The motion vector interpolation is performed every subarea on the basis of the detected vector by the interpolation method. An actual example of this method is shown in FIG. 15d. Plural motion vectors are detected, and one motion vector is selected from these detected motion vectors for each subarea to perform the interpolation processing. The arrow of FIG. 15d represents the direction to a subarea to be used for the interpolation processing. For example, at the leftmost position in FIG. 15d, two motion vectors are detected at the position E, and one of the motion vectors is assigned to the areas a and c while the other motion vector is assigned to the areas b and d, thereby performing the motion vector interpolation. In the case of FIG. 15d, each area is divided into two subareas, however, the number of the divisional subareas may be set to three or more.

(4) One of the methods (1), (2) and (3) as described above is adaptively selected for each subarea.

Adaptive Judgment

In the means 107 for selecting the motion vector interpolating method for every noted area, a motion vector interpolating method of a noted area is adaptively selected from the selecting methods as described above. As a selection method, prediction errors which would occur when each of the selection methods is selected are compared with one another, and a motion vector interpolating method which provides the minimum error is selected. Alternatively, the motion vector interpolating method may be selected in consideration of a coding efficiency. That is, when a motion vector interpolating method different from the conventional methods is selected, an additive code is needed for indication of a divisional pattern in order to indicate the type of the interpolating method, add the motion vector at an additive representative point, or perform further area division. Therefore, there is used a judgment method of allowing the selection of the motion vector interpolating method only when it is expected that the prediction performance can be enhanced to the extent that it offsets the increase of the additive coding amount. For example, a mean square prediction error per pixel in an area is calculated for each case, and an interpolating method which provides the minimum mean square prediction error is selected. In this case, if the improvement level of the interpolating method with respect to the conventional method exceeds a threshold level, the interpolating method is finally selected. Alternatively, in order to suppress the increase of the additive coding amount, a prediction method may be selected in accordance with the detected motion vector. According to this method, the prediction method can be determined on the basis of the motion vector information, so that no additive coding amount is needed. All the selection methods as described above may be used as selection candidates, or a part of the methods may be used.

Motion compensated interframe prediction

In the means 108 for performing the motion compensated interframe prediction in the area, on the basis of the selected motion vector interpolating method, the motion vector at each pixel in the area concerned is obtained for every area, and the motion compensated position on the reference image is calculated on the basis of the motion vector to determine the interframe prediction value.

In the moving picture coding system, as an image to be referred to for the motion detection and the motion compensated processing may be used a local decoded image of an image which is coded just before, or an image which can be generated from a decoded image of an image which was previously coded.

Motion vector interpolating method according to the third aspect of the present invention Next, the method of the means 301 for selecting the conversion method of the detected motion vector for every area and converting it to the value of the motion vector used for the interpolation processing will be described.

First, the area division is assumed to be performed by the sectioning the frame in a triangular grid structure as shown in FIG. 9. In this case, the interpolation of the motion vector is performed with the motion vectors VA,VB,VC detected at the representative points A,B, C according to the equation (4). According to the present invention, the values of the motion vectors used for the interpolation is converted by using the detected motion vectors VA, VB, VC. Now, the converted motion vectors are represented by V'A, V'B, V'C, and the vector conversion is defined by the following equation (11):

$$\begin{pmatrix} V'A \\ V'B \\ V'C \end{pmatrix} = W_3 \begin{pmatrix} VA \\ VB \\ VC \end{pmatrix} \quad (11)$$

Here, $W_3$ is a 3×3 matrix. The specific example and means of the matrix will be listed below.

$$\begin{pmatrix} 1 & 0 & 0 \\ 0 & 1 & 0 \\ 0 & 0 & 1 \end{pmatrix} \quad (A)$$

$$\begin{pmatrix} 1 & 0 & 0 \\ 1 & 0 & 0 \\ 1 & 0 & 0 \end{pmatrix} \quad (B)$$

$$\begin{pmatrix} 1 & 0 & 0 \\ 0 & 1 & 0 \\ 1/2 & 1/2 & 0 \end{pmatrix} \quad (C)$$

$$\begin{pmatrix} 1/3 & 1/3 & 1/3 \\ 1/3 & 1/3 & 1/3 \\ 1/3 & 1/3 & 1/3 \end{pmatrix} \quad (D)$$

A represents no conversion (the detected motion vectors are directly used), B represents that all vectors are replaced by VA, C represents that VC is replaced by the average value of VA, VB, and D represents that all vectors are replaced by the average value.

Next, the area division is performed by sectioning the frame in a rectangular grid structure. In this case, the interpolation of the motion vector is performed with the motion vectors VA,VB,VC,VD detected at the representative points A,B, C, D according to the equation (8). According to the present invention, like the sectioning operation using the triangular grid structure, the values of the motion vectors used for the interpolation are converted by using the detected motion vectors VA,VB,VC,VD. Now, the converted motion vectors are represented by V'A, V'B, V'C, V'D, and the vector conversion is defined by the following equation (12):

$$\begin{pmatrix} V'A \\ V'B \\ V'C \\ V'D \end{pmatrix} = W_4 \begin{pmatrix} VA \\ VB \\ VC \\ VD \end{pmatrix} \quad (12)$$

Here, $W_4$ is a 4×4 matrix. The specific example and means of the matrix will be listed below.

$$\begin{pmatrix} 1 & 0 & 0 & 0 \\ 0 & 1 & 0 & 0 \\ 0 & 0 & 1 & 0 \\ 0 & 0 & 0 & 1 \end{pmatrix} \quad (A)$$

$$\begin{pmatrix} 1 & 0 & 0 & 0 \\ 1 & 0 & 0 & 0 \\ 1 & 0 & 0 & 0 \\ 1 & 0 & 0 & 0 \end{pmatrix} \quad (B)$$

$$\begin{pmatrix} 1 & 0 & 0 & 0 \\ 0 & 1 & 0 & 0 \\ 0 & 0 & 1 & 0 \\ 0 & 0 & 1 & 0 \end{pmatrix} \quad (C)$$

$$\begin{pmatrix} 1 & 0 & 0 & 0 \\ 0 & 1 & 0 & 0 \\ 0 & 0 & 1 & 0 \\ 1/3 & 1/3 & 1/3 & 0 \end{pmatrix} \quad (D)$$

$$\begin{pmatrix} 1/4 & 1/4 & 1/4 & 1/4 \\ 1/4 & 1/4 & 1/4 & 1/4 \\ 1/4 & 1/4 & 1/4 & 1/4 \\ 1/4 & 1/4 & 1/4 & 1/4 \end{pmatrix} \quad (E)$$

A represents non-conversion (detected motion vectors are directly used), B represents that all vectors are replaced by VA, C represents that VD is replaced by VC, D represents that VD is replaced by the average value of VA,VB,VC, and E represents that all vectors are replaced by the average value Next, the area division is performed by sectioning the frame in a rectangular grid structure while each grid is located at the center of the area as shown in FIGS. 15a to 15d. In this case, the interpolation of the motion vector is performed with the motion vectors VA,VB,VC,VD,VE,VF, VG,VH,VI detected at the representative points A,B,C,D,E, F,G,H,I. According to the present invention, the values of the motion vectors used for the interpolation are converted by using the detected motion vectors VA,VB,VC,VD,VE,VF, VG,VH,VI. Now, the converted motion vectors are represented by V'A, V'B, V'C, V'D, V'E, V'F, V'G, V'H, V'I, and the vector conversion is defined by the following equation (13):

$$\begin{pmatrix} V'A \\ V'B \\ V'C \\ V'D \\ V'E \\ V'F \\ V'G \\ V'H \\ V'I \end{pmatrix} = W_9 \begin{pmatrix} VA \\ VB \\ VC \\ VD \\ VE \\ VF \\ VG \\ VH \\ VI \end{pmatrix} \quad (13)$$

Here, $W_9$ is a 9×9 matrix. The specific example and means of the matrix will be listed below.

$$\begin{pmatrix} 1 & 0 & 0 & 0 & 0 & 0 & 0 & 0 & 0 \\ 0 & 1 & 0 & 0 & 0 & 0 & 0 & 0 & 0 \\ 0 & 0 & 1 & 0 & 0 & 0 & 0 & 0 & 0 \\ 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \end{pmatrix} \quad (A)$$

$$\begin{pmatrix} 0 & 0 & 0 & 0 & 1 & 0 & 0 & 0 & 0 \\ 0 & 0 & 0 & 0 & 1 & 0 & 0 & 0 & 0 \\ 0 & 0 & 0 & 0 & 1 & 0 & 0 & 0 & 0 \\ 0 & 0 & 0 & 0 & 1 & 0 & 0 & 0 & 0 \\ 0 & 0 & 0 & 0 & 1 & 0 & 0 & 0 & 0 \\ 0 & 0 & 0 & 0 & 1 & 0 & 0 & 0 & 0 \\ 0 & 0 & 0 & 0 & 1 & 0 & 0 & 0 & 0 \\ 0 & 0 & 0 & 0 & 1 & 0 & 0 & 0 & 0 \\ 0 & 0 & 0 & 0 & 1 & 0 & 0 & 0 & 0 \end{pmatrix} \quad (B)$$

$$\begin{pmatrix} 1 & 0 & 0 & 0 & 0 & 0 & 0 & 0 & 0 \\ 0 & 1 & 0 & 0 & 0 & 0 & 0 & 0 & 0 \\ 0 & 0 & 1 & 0 & 0 & 0 & 0 & 0 & 0 \\ 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 1 & 0 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \end{pmatrix} \quad (C)$$

$$\begin{pmatrix} 1 & 0 & 0 & 0 & 0 & 0 & 0 & 0 & 0 \\ 0 & 1 & 0 & 0 & 0 & 0 & 0 & 0 & 0 \\ 0 & 0 & 1 & 0 & 0 & 0 & 0 & 0 & 0 \\ 0 & 0 & 0 & 1 & 0 & 0 & 0 & 0 & 0 \\ 0 & 0 & 0 & 0 & 1 & 0 & 0 & 0 & 0 \\ 0 & 0 & 0 & -1 & 2 & 0 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \end{pmatrix} \quad (D)$$

A represents non-conversion (all detected motion vectors are directly used), B represents that all vectors are replaced by VE C represents that vectors are unified in the direction of the point F by VE, and D represents that extrapolation is performed in the direction of the point F by the vectors VD,VE.

The matrix defining the conversion of the present invention is not limited to the above matrixes, and any matrix can be defined as the matrix $W_3$, $W_4$, $W_9$. Further, the same processing as the means 107 may be used as the selection criterion for the conversion method.

Method according to the fourth aspect of the present invention

Next, the means according to the fourth aspect of the present invention will be described. First, the method of the means 401 for setting as a prediction value a fixed value which is predetermined for every noted area will be described. In this embodiment, the area concerned is filled with a value irrespective of the detected motion vector. For example, the value of zero is set as the prediction value. Alternatively, the center value of a value range which can be obtained as signal values is set as the prediction value.

In the means 402 for selecting the method of setting the prediction value for every noted area, on the basis of the prediction result of the means 108 and the means 401, it is adaptively judged for every area to select which one of the two methods should be used to set the prediction value, and an interframe prediction image is generated according to the selected method.

As described above, according to the present invention, the frame is divided into plural areas, and the optimum prediction method can be adaptively selected on a divisional area basis. Therefore, the processing can be performed in accordance with the local image quality, and thus the prediction processing can be performed with high precision. Particularly when the frame partially contains a portion (image) which quickly moves (varies) or has a different motion from other portions, a motion vector prediction which is different from that of the other portions can be performed by selecting the optimum method from plural methods, so that the image reproduction can be performed accurately.

Although the present invention has been shown and described with respect to the best mode embodiments thereof, it should be understood by those skilled in the art that the foregoing and various other changes, omissions, and additions in the form and detail thereof may be made therein without departing from the spirit and scope of the present invention.

What is claimed is:

1. A motion compensated interframe prediction method comprising the steps of:

setting plural representative points at positions in a frame or at positions which are outside and in the neighborhood of the frame;

detecting first motion vectors at the representative points;

dividing the frame into plural areas for which a motion vector interpolating method is adaptively selected;

generating first interpolated motion vectors by interpolating, for each area of the plural areas, the first motion vectors on the basis of the representative points on a boundary of an area or on the basis of the representative points contained in the area and areas adjacent thereto;

detecting second motion vectors for each area of the plural areas separately from the representative points on the boundary of the area or contained in the area and areas adjacent thereto;

generating second interpolated motion vectors for each of the plural areas by interpolating the detected second motion vectors;

adaptively selecting either the first interpolated motion vector or the second interpolated motion vector for each area of the plural areas based on which of the first or second interpolated motion vectors requires the least amount of additional coding, wherein said adaptively selecting step selects the first interpolated motion vector interpolating method only when it is expected that the prediction performance can be enhanced to the extent that it offsets an increase of an additive coding amount; and performing motion compensated interframe prediction for each area of the plural areas on the basis of the selected interpolated motion vectors.

2. The method as set forth in claim 1, wherein the method for setting plural representative points is a method of determining the arrangement in which the representative points are located at apexes of rectangular blocks, and the method of detecting the motion vectors uses a block matching method in which a position is more greatly weighted as the position is nearer to the representative point positions.

3. The method as set forth in claim 1, wherein the method for setting plural representative points includes a method of determining the arrangement in which the representative points are located at apexes of triangular blocks.

4. The method as set forth in claim 1, wherein the method to interpolate the motion vectors is a method where a motion vector at each pixel in a patch is linearly interpolated from the motion vectors at three apexes of the patch when triangular patches are used.

5. The method as set forth in claim 1, wherein the method for dividing the frame includes a method for which the frame is divided so that a rectangular patch obtained by linking representative points is directly set as an area.

6. A motion compensated interframe prediction method comprising the steps of:

setting plural representative points contained in a noted area at positions in a frame or at positions which are outside a frame and in the neighborhood of the frame;

detecting motion vectors at the representative points;

dividing the frame into plural areas for which a motion vector interpolating method is adaptively selected;

generating first interpolated motion vectors by interpolating the motion vectors at all the pixel positions in the frame for each area of the plural areas on the basis of the motion vectors at the representative points;

further dividing the noted area into subareas in a predetermined divisional pattern;

generating second interpolated motion vectors by interpolating the motion vectors which contact a subarea; and adaptively selecting either the first interpolated motion vectors or the second interpolated motion vectors for each area of the plural areas based on which of the first or second interpolated motion vectors requires the least amount of additional coding; and performing motion compensated interframe prediction for each area of the plural areas on the basis of the selected interpolated motion vectors.

7. The method as set forth in claim 6, wherein the method for setting plural representative points is a method of determining the arrangement in which the representative points are located at apexes of rectangular blocks, and the method of detecting the motion vectors uses a block matching method in which a position is more greatly weighted as the position is nearer to the representative point positions.

8. The method as set forth in claim 6, wherein the method for setting plural representative points includes a method of determining the arrangement in which the representative points are located at apexes of triangular blocks.

9. The method as set forth in claim 6, wherein the method for interpolating the motion vectors is a method where a motion vector at each pixel in a patch is linearly interpolated from the motion vectors at three apexes of the patch when triangular patches are used.

10. The method as set forth in claim 6, wherein the method for dividing the frame includes a method for which the frame is divided so that a rectangular patch obtained by linking representative points is directly set as an area.

11. A motion compensated interframe prediction method comprising the steps of:

setting plural representative points at positions in a frame or at positions which are outside and in the neighborhood of the frame;

detecting motion vectors at the representative points;

dividing the frame into plural areas for which a motion vector interpolating method is adaptively selected;

adaptively selecting one of a plurality of conversion methods for converting the motion vectors for each area of the plural areas based on which of the plurality of conversion methods requires the least amount of additional coding;

converting the motion vectors into converted motion vectors according to the selected conversion method;

interpolating the converted motion vectors; and performing motion compensated interframe prediction for each area of the plural areas on the basis of the interpolated converted motion vectors.

12. The method as set forth in claim 11, wherein the method for setting plural representative points is a method of determining the arrangement in which the representative points are located at apexes of rectangular blocks, and the method of detecting the motion vectors uses a block matching method in which a position is more greatly weighted as the position is nearer to the representative point positions.

13. The method as set forth in claim 11, wherein the method for setting plural representative points includes a method of determining the arrangement in which the representative points are located at apexes of triangular blocks.

14. The method as set forth in claim 11, wherein the method for interpolating the motion vectors is a method where a motion vector at each pixel in a patch is linearly interpolated from the motion vectors at three apexes of the patch when triangular patches are used.

15. The method as set forth in claim 11, wherein the method for dividing the frame includes a method for which the frame is divided so that a rectangular patch obtained by linking representative points is directly set as an area.

16. A motion compensated interframe prediction method comprising the steps of:

setting plural representative points at positions in a frame or at positions which are outside and in the neighborhood of the frame;

detecting motion vectors at the representative points;

dividing the frame into plural areas for which a motion vector interpolating method is adaptively selected;

interpolating the motion vectors for each area of the plural areas on the basis of the motion vectors at the representative points;

generating a first prediction value for each area of the plural areas by performing a motion compensated interframe prediction using the interpolated motion vectors;

setting a fixed value as a second prediction value for each area of the plural areas, the fixed value being predetermined for each area of the plural areas; and adaptively selecting either the first prediction value or the second prediction value based on whether there is any additional coding required for the motion compensated interframe prediction used to generate the first prediction value which exceeds a predetermined value.

17. The method as set forth in claim 16, wherein the method for setting plural representative points is a method of determining the arrangement in which the representative points are located at apexes of rectangular blocks, and the method of detecting the motion vectors uses a block matching method in which a position is more greatly weighted as the position is nearer to the representative point positions.

18. The method as set forth in claim 16, wherein the method for setting plural representative points includes a method of determining the arrangement in which the representative points are located at apexes of triangular blocks.

19. The method as set forth in claim 16, wherein the method for interpolating the motion vectors is a method where a motion vector at each pixel in a patch is linearly interpolated from the motion vectors at three apexes of the patch when triangular patches are used.

* * * * *